(12) United States Patent
Shi (10) Patent No.: US 11,338,411 B2
(45) Date of Patent: May 24, 2022

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventor: Zehua Shi, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 144 days.

(21) Appl. No.: 16/300,435

(22) PCT Filed: May 10, 2017

(86) PCT No.: PCT/US2017/032011
§ 371 (c)(1),
(2) Date: Nov. 9, 2018

(87) PCT Pub. No.: WO2017/197019
PCT Pub. Date: Nov. 16, 2017

(65) Prior Publication Data
US 2019/0224813 A1    Jul. 25, 2019

(30) Foreign Application Priority Data
May 10, 2016    (CN) .......................... 201610304395.3

(51) Int. Cl.
*B24D 3/28* (2006.01)
*B24D 18/00* (2006.01)
(Continued)

(52) U.S. Cl.
CPC ............... *B24D 3/28* (2013.01); *B24D 3/346* (2013.01); *B24D 18/00* (2013.01); *C08L 61/06* (2013.01);
(Continued)

(58) Field of Classification Search
CPC ...... B24D 3/28; B24D 18/0009; B24D 18/00; B24D 3/346; C09K 3/1463; C09K 3/1436; C08L 61/06; C08L 2205/025
See application file for complete search history.

(56) References Cited

U.S. PATENT DOCUMENTS 3,481,901 A    12/1969    Prochaska
3,487,045 A    12/1969    Shepard et al.
(Continued)

FOREIGN PATENT DOCUMENTS

CN    1229376 A    9/1999
CN    101253023 A    9/1999
(Continued)

OTHER PUBLICATIONS

International Search Report and Written Opinion for PCT/US2017/032011, dated Aug. 21, 2017, 13 pages.

*Primary Examiner* — Pegah Parvini
(74) *Attorney, Agent, or Firm* — Abel Schillinger, LLP; Joseph P. Sullivan (57) ABSTRACT

An abrasive article can include a body including a bond material and abrasive particles contained within the bond material. The bond material can include an organic material including a resin, particularly a phenolic resin. A methylene bridge can be present at para or ortho sites of aromatic phenolic rings. The bond material can include an average ortho to para substituent ratio for the methylene bridge
(Continued)

within a range including at least 1.5:1 and not greater than 9:1, particularly, within a range including at least 3 and not greater than 6.9.

17 Claims, 5 Drawing Sheets

(51) Int. Cl.
  *B24D 3/34* (2006.01)
  *C08L 61/06* (2006.01)
  *C09K 3/14* (2006.01)
(52) U.S. Cl.
  CPC ...... *C09K 3/1436* (2013.01); *C08L 2205/025* (2013.01)

(56) References Cited

U.S. PATENT DOCUMENTS

| | | |
|---|---|---|
| 4,403,066 A | 9/1983 | Brode et al. |
| 5,178,646 A | 1/1993 | Barber, Jr. et al. |
| 5,432,227 A | 7/1995 | Fujimura |
| 5,654,382 A | 8/1997 | Dubois et al. |
| 5,910,521 A | 6/1999 | Johnson et al. |
| 5,912,216 A * | 6/1999 | Thimmappaiah ...... B24D 3/346 51/298 |
| 8,961,269 B2 * | 2/2015 | Zhang ................ B24D 18/0009 451/56 |
| 2002/0137844 A1 * | 9/2002 | Narisawa ................ C08L 61/06 525/100 |
| 2012/0225611 A1 * | 9/2012 | Zhang .................... B24D 18/00 451/56 |
| 2014/0004316 A1 | 1/2014 | Zhang |
| 2016/0347949 A1 * | 12/2016 | Harada .................... C08J 3/203 |

FOREIGN PATENT DOCUMENTS

| | | |
|---|---|---|
| JP | S56-146676 A | 11/1981 |
| JP | 2013-527045 A | 6/2013 |
| WO | 9915571 A1 | 4/1999 |
| WO | 2015118996 A1 | 8/2015 |

* cited by examiner

ABRASIVE ARTICLES AND METHODS FOR FORMING SAME

CROSS-REFERENCE TO RELATED APPLICATIONS

This application is the National Stage of International Application No. PCT/US2017/32011, entitled "ABRASIVE ARTICLES AND METHODS FOR FORMING SAME", by Zehua SHI, filed May 10, 2017, which claims priority to Chinese application 201610304395.3, entitled "ABRASIVE ARTICLES AND METHODS FOR FORMING SAME", by Zehua SHI, filed May 10, 2016, both of which applications are assigned to the current assignee hereof and incorporated herein by reference in their entireties.

TECHNICAL FIELD

The present invention relates to abrasive articles and methods of forming the abrasive articles.

BACKGROUND ART

Abrasive articles, such as abrasive wheels, can be used to remove materials from workpieces. Wear rate of an abrasive tool affects consistency of performance and the service life span of the abrasive tool. In wet grinding processes, fluids are used to cool and lubricate grinding wheels and workpieces to remove debris and improve grinding efficiency. The wet retention abilities of grinding wheels also affect consistency of wheel performance. The industry continues to demand improved abrasive articles.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments disclosed herein are related to abrasive articles including a particular bond material. The bond material can include a methylene bridge, and the ortho substituent of the methylene bridge can be in a higher content than the para substituent. For instance, the bond material can have an average ortho to para substituent ratio higher than 1, such as at least 1.5:1. In a particular embodiment, the ratio can be from at least 3:1 to not greater than 6.9:1. An abrasive article including a bond material having higher ortho to para substituent ratio can have improved performance and increased service life. In embodiments disclosed herein, representative grinding wheels demonstrated improved wet retention and extended consistency in performance as compared to those formed including conventional bond materials.

Other embodiments are related to a method of forming an abrasive article utilizing a bond material having an ortho to para substituent ratio higher than 1, such as at least 1.5:1. The method can allow formation of abrasive articles having improved performance. As compared to conventional abrasive articles, abrasive articles formed in accordance with embodiments herein demonstrated, for example, a lower wear rate while keeping the same material removal rate.

Figure 1:
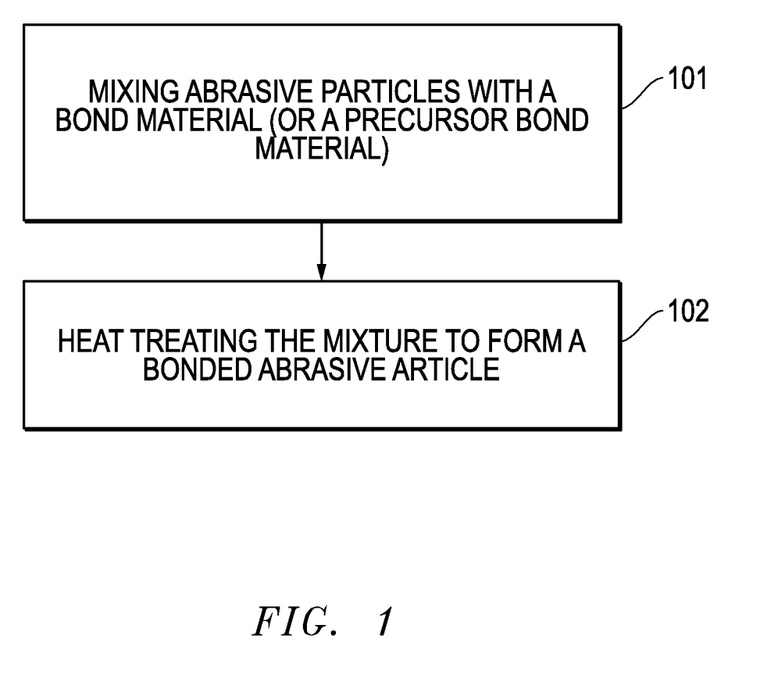
FIG. 1 includes a flow chart for forming an abrasive article.

FIG. 1 includes a flow chart of a method of forming an abrasive article in accordance with an embodiment. At step 101, a mixture can be made including a bond material (or precursor of the bond material) and abrasive particles. The mixture may also include one or more optional additives, including for example, secondary abrasive particles, fillers, reinforcing materials, and the like.

According to at least one embodiment, the bond material can be present in the mixture in a content from 1 wt % to 5 wt % for a total weight of the mixture. According to a further embodiment, the bond material can include at least one organic material, such as natural organic materials or synthetic organic materials. According to another embodiment, the bond material can include a thermoset or a thermoplastic. For example, the bond material can include a resin, such as phenolic resins, epoxy resins, polyester resins, polyurethanes, polyester, rubber, polyimide, polybenzimidazole, aromatic polyamide, modified phenolic resins (such as: epoxy modified and rubber modified resins, or phenolic resin blended with plasticizers, etc.), and the like, as well as any combination thereof. According to a further embodiment, the bond material can include a phenolic resin. According to a particular, but non-limiting embodiment, the bond material can consist essentially of a phenolic resin. Exemplary phenolic resins can include resole and novolac.

According to a further embodiment, the bond material can include a novolac resin. The novolac resin may be present in the bond material in a certain content that can facilitate formation of an abrasive article with improved performance. In a non-limiting embodiment, the novolac resin may have a content of at least 60 wt % relative to a total weight of the bond material, such as at least 70 wt % or at least 75 wt % or at least 80 wt % or even at least 85 wt % for the total weight of the bond material. In another non-limiting embodiment, the novolac resin may not be greater than 95 wt % of the total weight of the bond material, such as not greater than 90 wt % or not greater than 88 wt %. It is to be understood that the content of the novolac resin can include any of the minimum and maximum percentages disclosed herein.

In another embodiment, the bond material can include a resole resin in a content that can facilitate formation of an abrasive article with improved performance. For example, the resole resin may be present in the bond material in a content of not greater than 40 wt %, or not greater than 30 wt %, or not greater than 20 wt or even not greater than 15 wt % of the total weight of the bond material. In yet another non-limiting embodiment, the liquid form may be present for at least 5 wt % or at least 10 wt % or at least 12 wt %. It is to be understood the content of the resole resin can include any of the minimum and maximum percentages disclosed herein. In a particular, yet non-limiting embodiment, the bond material can include a novolac resin and a resole resin.

In an embodiment, the novolac resin can include a dimer, for instance, bisphenol F. In a further embodiment, bisphenol F can include a methylene bridge at an ortho position, a para position, or both of phenolic aromatic rings. In a further embodiment, the novolac resin can include bisphenol F having an ortho-ortho' methylene bridge, bisphenol F having a para-para' methylene bridge, bisphenol F having an ortho-para' methylene bridge, or any combination thereof. In another non-limiting embodiment, the novolac resin can include a monomer, a dimer, an oligomer, a polymer, or a combination thereof. In a further embodiment, the oligomer, polymer, or both can be derived from bisphenol F.

In this disclosure, contents of bisphenol F isomers in novolac resin are quantified by gas chromatograph coupled with a flame ionization detector (referred to as GC-FID hereinafter). Agilent 7890 GC with HD (Agilent Technologies) is used. Prior to testing a sample of novolac resin, calibration using bisphenol F reference standards of each isomer and external standard quantification and calibration using dihydroxydiphenylmethane reference standard solutions are performed to obtain a calibrated curve of each bisphenol F isomer, which is compensated for potential internal and external sources of errors and used to calculate contents of each bisphenol F isomer in the sample.

Bisphenol F isomer reference standards are formed using commercially available ortho-para-para', and ortho-para isomers having purity above 99%. The reference standards are formed by mixing 0.005 g, 0.01 g, 0.02 g, and 0.04 g of a bisphenol F isomer with methanol of 50 ml. Dihydroxydiphenylmethane solutions are formed having concentrations of 0.005 g/50 ml, 0.01 g/50 ml, 0.02 g/50 ml, and 0.04 g/50 ml. A novolac sample of 0.5000 g is mixed with 25 ml of methanol, which is kept at room temperature (20° C. to 25° C.) for 30 min. The supernatant of the mixture is then transferred into a clean glass vial of 20 ml, and filtered through a PTFE sieve of 0.45 microns. Infiltrate is collected, and 1.5 ml of it is transferred into a vial of 2 ml for test.

Duplicates of each of the reference standards and the prepared sample are tested with GC-FID using the same conditions. For each test, 1 μl of a standard or sample is injected into the GC-FID detector and passed through a DB-5 ms capillary column. The split ratio is set at 20:1. The capillary column includes a film of 0.50 μm and has 5% phenyl and 95% methyl siloxane. The length and diameter of the column is 30 m and 0.53 mm, respectively. The temperature is first set at 45° C. for 2 minutes, and increased to 280° C. at a heating rate of 10° C./min and set at 280° C. for 3 minutes. The injector temperature is set at 265° C. and the detector temperature is 350° C. Nitrogen is used as the carrier gas with the flow rate of 5 ml/min in the constant flow mode. The run time for a test is 28.5 minutes.

The OpenLAB software (developed by Agilent Technology) is used to analyze test data. Data of the reference standards of each isomer is analyzed in the ESTD % mode so that the identified peak area of the corresponding bisphenol F isomer is integrated and a calibrated standard curve is generated. The calibrated curves of the isomers are used to analyze the GC-FID data of the novolac sample to obtain the quantitation of the isomers present in the sample. The average of the duplicates is used as an average content of an isomer. In some instances, a novolac resin sample may be tested by different operators following the same process disclosed herein, and the average of all of the test results for an isomer is used as an average content of the isomer in the tested novolac resin.

According to an embodiment, the novolac resin can include ortho-ortho' bisphenol F in a first average content for a total weight of the novolac resin. The first average content can be at least 2 wt % to facilitate formation of an abrasive article with improved performance. For example, the first average content can be at least 2.1 wt % or at least 2.4 wt % or at least 2.8 wt % or at least 3.4 wt % or at least 4.4 wt % or at least 5.4 wt % or even at least 6 wt % relative to a total weight of the novolac resin. In another embodiment, the first average content may not be greater than 10.5 wt %, such as not greater than 9.7 wt % or not greater than 9.1 wt % or not greater than 8.7 wt % or not greater than 8.1 wt % or not greater than 7.7 wt % or greater than 6.9 wt % or even not greater than 6.7 wt % relative to a total weight of the novolac resin. In a further embodiment, the first average content of ortho-ortho' bisphenol F can be within a range including any of the minimum and maximum percentages disclosed herein. For instance, the first average content can be within a range including at least 2 wt % and not greater than 9.7 wt % for the total weight of the novolac resin, or within a range including at least 5.4 wt % and not greater than 7.7 wt % for a total weight of the novolac resin.

According to an embodiment, the novolac resin can include para-para' bisphenol F in a second average content for a total weight of the novolac resin. The second average content may not be greater than 4 wt % to facilitate formation of an abrasive article with improved performance. For example, the second average content may not be greater than 3.3 wt % or not greater than 3.1 wt % or not greater than 2.8 wt % or not greater than 2.3 wt % or not greater than 1.8 wt % or not greater than 1.3 wt % or not greater than 0.9 wt % or even not greater than 0.5 wt % relative to the total weight of the novolac resin. In another embodiment, the second average content may be at least 0.01 wt %, such as at least 0.05 wt % or at least 0.1 wt % or at least 0.15 wt or even at least 0.2 wt % or at least 0.55 wt % or at least 1.05 wt % or at least 1.55 wt % of the total weight of the novolac resin. In a further embodiment, the second average content of para-para' bisphenol F can be within a range including any of the minimum and maximum percentages disclosed herein. For instance, the second average content can be within a range including at least 0.01 wt % and not greater than 4 wt % for the total weight of the novolac resin, or within a range including at least 0.05 wt % and not greater than 2.8 wt %.

According to an embodiment, the bond material can include ortho-para bisphenol F in a third average content fir a total weight of the novolac resin. The third average content may not be greater than 3.1 wt % to facilitate formation of an abrasive article with improved performance. For example, the third content may not be greater 2.9 wt % or not greater than 2.7 wt % or even not greater than 2.5 wt %. In another embodiment, the third average content may be at least 0.5 wt %, such as at least 0.8 wt % or at least 1.1 wt % or at least 1.5 wt % or even at least 2 wt % of the total weight of the novolac resin. In a further embodiment, the third average content of ortho-para bisphenol F can be within a range including any of the minimum and maximum percentages disclosed herein. For instance, the third average content can be within a range including at least 0.5 wt % and not greater than 3.1 wt % for the total weight of the novolac resin.

According to an embodiment, the bond material can include an average ortho to para substituent ratio. The average ortho to para substituent ratio can be determined by using formula: $R=(W_1-W_3/2):(W_2+W_3/2)$, where R is an average ortho to para substituent ratio, $W_1$ is the first average content of the bisphenol F ortho-ortho' isomer, $W_2$ is the second average content of bisphenol F the para-para' isomer, and $W_3$ is the third average content of bisphenol F ortho-para isomer as disclosed herein. In a particular embodiment, the bond material can include an ortho to para substituent ratio of at least 1.4:1 to facilitate formation of an abrasive article with improved performance. For example, the ratio can be at least 1.5:1 or at least 1.6:1 or at least 1.7:1 or at least 1.8:1 or at least 1.9:1 or at least 2.0:1 or at least 2.1:1 or at least 2.5:1 or at least 2.6:1 or at least 2.7:1 or at least 2.8:1 or at least 2.9:1 or at least 3:1 or at least 3.1:1 or at least 3.2:1 or at least 3.3:1 or at least 3.4:1 or at least 3.5:1 or at least 3.6:1 or at least 3.7:1 or at least 3.8:1 or at least 3.9:1 or at least 4.0:1 or at least 4.1:1 or at least 4.2:1 or at least 4.3:1 or at least 4.4:1 or at least 4.5:1 or at least 4.6:1 or at least 4.7:1 or at least 4.8:1 or at least 4.9:1 or at least 5:1 or at least 5.1:1 or at least 5.2:1 or at least 5.3:1 or at least 5.4:1 or at least 5.5:1 or at least 5.6:1 or at least 5.7:1. In another particular embodiment, the average ratio may be not greater than 8.2:1, such as not greater than 8.1:1 or not greater than 8:1 or not greater than 7.9:1 or not greater than 7.8:1 or not greater than 7.7:1 or not greater than 7.6:1 or not greater than 7.5:1 or not greater than 7.4:1 or not greater than 7.3:1 or not greater than 7.2:1 or not greater than 7.1:1 or not greater than 7.0:1 or not greater than 6.9:1. It is to be appreciated that the average ortho to para substituent ratio can be within a range including any of the minimum and maximum ratios disclosed herein. For example, the average ratio can be within a range including at least 1.4:1 and not greater than 8.2:1, or within a range including at least 2:1 and not greater than 8:1, or within a range including at least 3:1 and not greater than 6.9:1.

In an embodiment, the bond material can be in a powder or a liquid form, or include a combination thereof. For instance, the bond material can include a powder phenolic resin and a liquid phenolic resin. In a further embodiment, the powder bond material can include novolac resin, and the liquid bond material can include resole resin. The powder, liquid form bond material, or both can be a precursor bond material, which may be formed into a finally-formed bond material of an abrasive article by curing.

In another embodiment, the bond material can include a curing agent or a cross-link agent. The curing or cross-link agent can include an amine. Exemplary amines can include ethylene diamine, ethylene triamine, methyl amines, or the like. In a particular embodiment, the curing or cross-finking agent can include hexamethylene tetramine. At temperatures in excess of about 90° C., some examples of the hexamethylene tetramine may form crosslinks to form methylene and dimethylene amino bridges that help cure the resin. The hexamethylene tetramine may be uniformly dispersed within the resin. More particularly, hexamethylene tetramine may be uniformly dispersed within resin regions as a cross-linking agent. In a more particular embodiment, the bond material can include a phenolic resin modified with a curing or cross-linking agent. In a particular embodiment, the bond material can include novalce resin modified with a curing agent, such as hexamethylene tetramine. In a more particular embodiment, hexamethylene tetramine is in a content of 5 wt % to 15 wt % of the total weight of the novalc resin. Even more particularly, the phenolic resin may contain resin regions with cross-linked domains having a sub-micron average size.

As disclosed herein, in addition to the bond material, the mixture can include abrasive particles. The abrasive particles can be in a content from 55 wt % to 99 wt % for a total weight of the mixture. In an embodiment, the abrasive particles can include materials such as oxides, carbides, nitrides, borides, carbon-based materials (e.g., diamond), oxycarbides, oxynitrides, oxyborides, and a combination thereof. According to one embodiment, the abrasive particles can include a superabrasive material. The abrasive particles can include a material selected from the group of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof. In another instance, abrasive particles may also include silicon carbide, brown fused alumina, white alumina, seeded gel abrasive, sintered alumina with additives, shaped and sintered aluminum oxide, pink alumina, ruby alumina, electrofused monocrystalline alumina, alumina zirconia abrasives, extruded bauxite, sintered bauxite, cubic boron nitride, diamond, aluminum oxy-nitride, sintered alumina, extruded alumina or any combination thereof. According to one particular embodiment, the abrasive particles can consist essentially of silicon carbide. According to another particular embodiment, the abrasive particles can consist essentially of alumina, such as alpha alumina. According to another particular embodiment, the abrasive particles can consist essentially of nanocrystalline alumina particles. The abrasive particles can have a Mohs hardness of at east 7, such as at east 8, or even at least 9.

The abrasive particles may have other particular features. For example, the abrasive particles can be shaped abrasive particles. According to at least one embodiment, the abrasive particles can include a two dimensional shape, a three-dimensional shape, or a combination thereof. Exemplary two dimensional shapes include regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof. In accordance with an embodiment, the abrasive particles can consist of any of the above noted two dimensional shapes. Exemplary three-dimensional shapes can include a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof. A monostatic shape can be a shape with a single stable resting position. In accordance with another embodiment, the abrasive particles can consist of any of the above noted three dimensional shapes. In a particular embodiment, the shaped abrasive particles can include a triangular two-dimensional shape. In another particular embodiment, the shaped abrasive particles can include a partially-concave triangular two-dimensional shape. The shaped abrasive particles and methods of forming can be found in US2013/0236725 A1 by Donik O. Yener, et and US 2012/0167481 by Doruk O. Yener, et al., both of which are incorporated herein by reference in their entireties.

In a particular embodiment, the abrasive particles may have an elongated shape. In a further embodiment, the abrasive particles may have an aspect ratio, defined as a ratio of the length:width of at least about 1:1, wherein the length is the longest dimension of the particle and the width is the second longest dimension of the particle (or diameter) perpendicular to the dimension of the length. In other embodiments, the aspect ratio of the abrasive particles can be at least about 2:1, such as at least about 2.5:1, at least about 3:1, at least about 4:1, at least about 5:1, or even at least about 10:1, In one non-limiting embodiment, the abrasive particles may have an aspect ratio of not greater than about 5000:1.

According to another particular embodiment, at least a portion of the abrasive particles may include shaped abrasive particles as disclosed for example, in US 2015/0291865 by Kristin Brender, et al., US 2015/0291866 by Christoher Arcona et al., and US 2015/0291867 by Kristin Brender, et al., all of which are incorporated herein by reference in their entireties. Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

In at least one embodiment, the abrasive particles can include crystalline grains (i.e., crystallites), and may consist entirely of a polycrystalline material made of crystalline grains. In particular instances, the abrasive particles can include crystalline grains having a median grain size of not greater than 1.2 microns. In other instances, the median grain size can be not greater than 1 micron, such as not greater than 0.9 microns or not greater than 0.8 microns or even not greater than 0.7 microns. However, the nanocrystalline alumina particles may have an average crystallite size of not greater than 0.15 microns, such as not greater than 0.14 microns, not greater than 0.13 microns or even not greater than 0.12 microns. According to one non-limiting embodiment, the median grain size of the abrasive particles can be at least 0.01 microns, such as at least 0.05 microns or at least 0.1 microns or at least 0.2 microns or even at least 0.4 microns. It will be appreciated that the median grain size of the abrasive particles can be within a range between any of the minimum and maximum values noted above. The median grain size is measured by an uncorrected intercept method by SEM micrographs. The nanocrystalline alumina disclosed herein can be ceramic corundum abrasive particles.

In accordance with an embodiment, the abrasive particles can have an average particle size, as measured by the largest dimension (i.e., length) of at least about 100 microns. In fact, the abrasive particles can have an average particle size of at least about 150 microns, such as at least about 200 aderons, at least about 300 microns, at least about 400 microns, at least about 500 microns, at least about 600 microns, at least about 700 microns, at least about 800 microns, or even at least about 900 microns. Still, the abrasive particles of the embodiments herein can have an average particle size that is not greater than about 5 mm, such as not greater than about 3 mm, not greater than about 2 mm, or even not greater than about 1.5 mm. It will be appreciated that the abrasive particles can have an average particle size within a range between any of the minimum and maximum values noted above.

According to an embodiment, the mixture and the resulting abrasive article can include a blend of abrasive particles. The blend of abrasive particles can include a first type of abrasive particle and a second type of abrasive particle that is distinct from the first type of abrasive particle in at least one aspect, such as particle size, grain size, composition, shape, hardness, friability, toughness, and the like. For example, in one embodiment, the first type of abrasive particle can include a premium abrasive particle (e.g., fused alumina, alumina-zirconia, seeded sol gel alumina, shaped abrasive particle, etc.) and the second type of abrasive particle can include a diluent abrasive particle. According to a non-limiting embodiment, the secondary abrasive particles can include alumina oxide, silicon carbide, cubic boron nitride, diamond, flint and garnet grains, and any combination thereof. In other non-limiting embodiments, the blend may include a third type of abrasive particles that may include a conventional abrasive particle or a shaped abrasive particle. The third type of abrasive particles may include a diluent type of abrasive particles having an irregular shape, which may be achieved through conventional crushing and comminution techniques. The third type of abrasive particles may be distinct from the first type of abrasive particles and the second type of abrasive particles in composition or any other aspect disclosed in embodiments herein.

The blend of abrasive particles can include a first type of abrasive particles present in a first content (C1), which may be expressed as a percentage (e.g., a weight percent) of the first type of abrasive particles as compared to the total content of particles of the blend. For example, in certain instances, the blend can be formed such that the first content (C1) may be not greater than 90% of the total content of the blend. In another embodiment, the first content may be less, such as not greater than 85% or not greater than 80% or not greater than 75%. Still, in one non-limiting embodiment, the first content of the first type of abrasive particles may be present in at least 10% of the total content of the blend, such as at least 15%, at least 20%, at least 25%, at least 30%, at least 35%, at least 40%, at least 45%, or at least 50%. It will be appreciated that the first content (C1) may be present within a range between any of the minimum and maximum percentages noted above.

Furthermore, the blend of abrasive particles may include a second content (C2) of the second type of abrasive particles, expressed as a percentage (e.g., a weight percent) of the second type of abrasive particles relative to the total weight of the blend. The second content can be the same as or different from the first content. For example, the second content (C2) may be not greater than 55% of the total content of the blend, such as not greater than 50%, such as not greater than 40%, not greater than 35%, not greater than 30%, or not greater than 25%. Still, in one non-limiting embodiment, the second content (C2) may be present in an amount of at least about 1% of the total content of the blend. For example, the second content may be at least 5%, such as at least 8%, at least 10%, or at least 12%. It will be appreciated that the second content (C2) can be within a range between any of the minimum and maximum percentages noted above.

In some embodiments, the blend of abrasive particles may include a third content (C3) of the third type of abrasive particles, expressed as a percentage (e.g., a weight percent) of the third type of abrasive particles relative to the total weight of the blend. The third content can be the same as or different from the first content, the second content, or both. For example, the third content (C3) may be not greater than 50% of the total content of the blend, such as not greater than 45%, such as not greater than 40%, not greater than 35%, not greater than 30%, not greater than 25%, or not greater than 20%. Still, in one non-limiting embodiment, the third content (C3) may be present in an amount of at least about 1% of the total content of the blend. For example, the third content may be at least 3%, such as at least 5%, at least 8%, or at least 10%. It will be appreciated that the third content (C3) can be within a range between any of the minimum and maximum percentages noted above.

As described herein, other materials, such as a filler, can be included in the mixture. The filler may or may not be present in the finally-formed abrasive article. Examples of the filler can include powders, granules, spheres, fibers, pore formers, hollow particles, and a combination thereof. The filler can be selected from the group consisting of powders, granules, spheres, fibers, pore formers, polymer hollow particles, and a combination thereof. In a further embodiment, the filler can include a material selected from the group consisting of sand, bubble alumina, chromites, magnetite, dolomites, bubble mullite, borides, titanium dioxide, carbon products, silicon carbide, wood flour, clay, talc, hexagonal boron nitride, molybdenum disulfide, feldspar, nepheline syenite, glass spheres, glass fibers, $CaF_2$, $KBP_4$, Cryolite ($Na_3AlF_6$), potassium Cryolite ($K_3AlF_6$), pyrite, ZnS, copper sulfide, mineral oil, fluorides, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite, carbonates, calcium carbonate, saran, phenoxy resin, CaO, $K_2SO_4$, mineral wool, $MnCl_2$, KCl, and a combination thereof.

In accordance with another embodiment, the filler can include a material selected from the group consisting of an antistatic agent, a lubricant, a porosity inducer, coloring agent, and a combination thereof. In particular instances wherein the filler is particulate material, it may be distinct from the abrasive particles, being significantly smaller in average particle size than the abrasive particles.

After forming the mixture with the desired components and shaping the mixture in desired processing apparatus, the process can continue to step 102 by treating the mixture to form a finally-formed abrasive article. Some suitable examples of treating can include heating, curing, polymerization, pressing, and a combination thereof. Curing can take place in the presence of heat. For example, the mixture can be held at a final cure temperature for a period of time, such as between 6 hours and 48 hours, between 10 and 36 hours, or until the mixture reaches the cross-linking temperature or desired density is obtained. Selection of the curing temperature depends, for instance, on factors such as the type of bonding material employed, strength, hardness, and grinding performance desired. According to certain embodiments, the curing temperature can be in the range including at least 150° C. to not greater than 250° C. In more specific embodiments employing organic bonds, the curing temperature can be in the range including at least 150° C. to not greater than 230° C. Polymerization of phenol based resins may occur at a temperature in the range of including at least 110° C. and not greater than 225° C. Resole resins can polymerize at a temperature in a range of including at least 140° C. and not greater than 225° C. Certain novolac resins suitable for the embodiments herein can polymerize at a temperature in a range including at least 110° C. and not greater than 195° C.

After finishing the treating process, the abrasive article is formed including abrasive particles contained within the bond material. In a particular embodiment, the abrasive article can be a bonded abrasive article. The bonded abrasive article can include a body including abrasive grains contained in a three-dimensional matrix of the bond material. The bonded abrasive body may be formed into any suitable shape as known by those of skill in the art, including but not limited to, abrasive wheels, cones, hones, cups, flangedwheels, tapered cups, segments, mounted-point tools, discs, thin wheels, large diameter cut-off wheels, and the like.

According to an embodiment, the bonded abrasive body can include a certain content of the bond material relative to a total volume of the body, which may facilitate improved formation and/or performance of an abrasive article. For example, the content of the bond material can be at least 1 vol %, such as at least 2 vol %, at least 5 vol %, at least 10 vol %, at least 20 vol %, at least 30 vol %, at least 35 vol %, at least 40 vol %, or at least 45 vol % for the total volume of the body. For another instance, the content of the bond material may be not greater than 98 vol %, such as not greater than 95 vol %, not greater than 90 vol %, not greater than 85 vol %, not greater than 80 vol %, not greater than 75 vol %, not greater than 70 vol %, not greater than 65 vol %, or not greater than 60 vol %, not greater than 55 vol %, not greater than 50 vol %, or not greater than 45 vol %, not greater than 40 vol %, or not greater than 35 vol %, not greater than 30 vol %, or not greater than 25 vol %. It is to be appreciated that the content of the bond material can be within a range including any of the minimum to maximum percentages noted above. For example, the content of the bond material in the body can be within a range of 1 vol % to 98 vol %, within a range of 5 vol % to 65 vol %, or within a range of 10 vol % to 35 vol %.

According to a further embodiment, the bond material present in the bonded body can include phenolic aromatic rings having a methylene bridge at ortho positions, para positions, or both. In this disclosure, Microscopic fourier transform infrared spectroscopy (referred to as FT-IR herein after) is used to measure ortho substituents and para substituents of the methylene bridge in the bonded body of an abrasive article. Prior to a micro FT-IR test, at least 2 samples taken from random regions of an abrasive article are treated as disclosed herein to provide a proper surface for performing the micro FT-IR test.

The samples usually have a size from 3 microns to 200 microns and are mounted on a fixture using epoxy resin at ambient temperature (20° C. to 25° C.). The surface of each sample is grinded and polished using the steps and parameters disclosed in Table 1 below to provide a clear cross-section for scanning using a micro FT-IR apparatus. Step 1 is performed when a sample is cut out from a wheel using an abrasive cut-off machine so that damaged parts can be removed by grinding and a relative flat surface can be formed prior to polishing steps. Step 3 can be repeated as many times as necessary to form an evenly polished surface. After performing the steps of 1 to 7, the surface is ready for micro FT-IR. Each surface of the samples is scanned using wave number 650 cm$^{-1}$ to 4000 cm$^{-1}$ for at least 32 times with a Thermo Scientific™ Nicolet™ iN™ 10 micro FT-IR apparatus. The apparatus is set in the attenuated total reflectance mode. A readout as illustrated in FIGS. 2A and 2B is provided by the micro FT-IR apparatus at the end of the test, which demonstrates the averaged ortho and para signals of all of the scans for a surface.

Figure 2A:
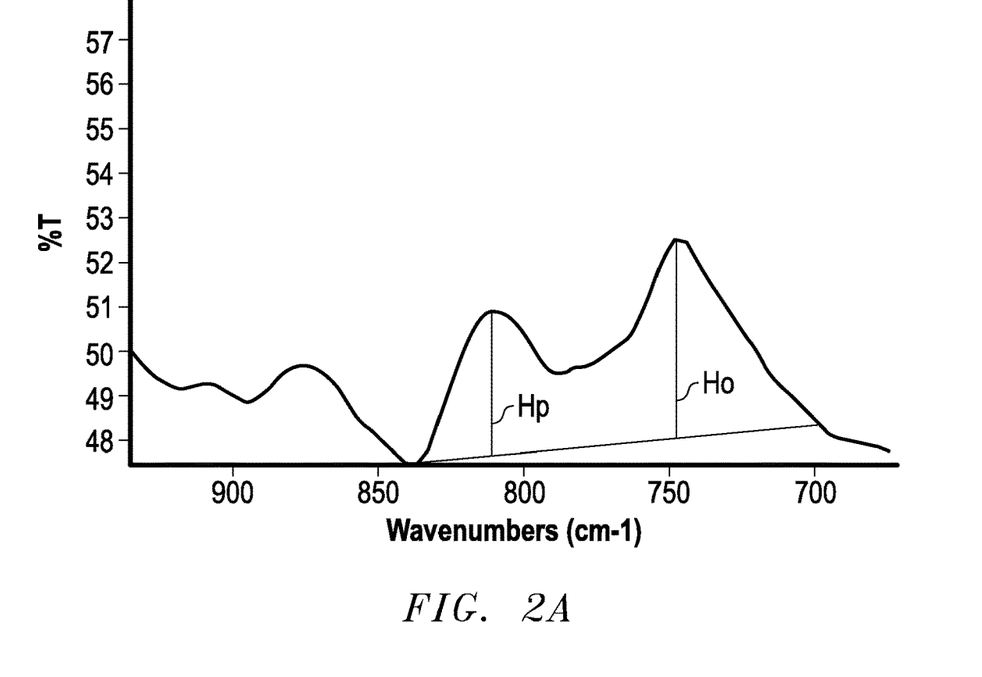
FIG. 2A includes a graph of a micro FT-IR readout of a conventional abrasive article sample.
Figure 2B:
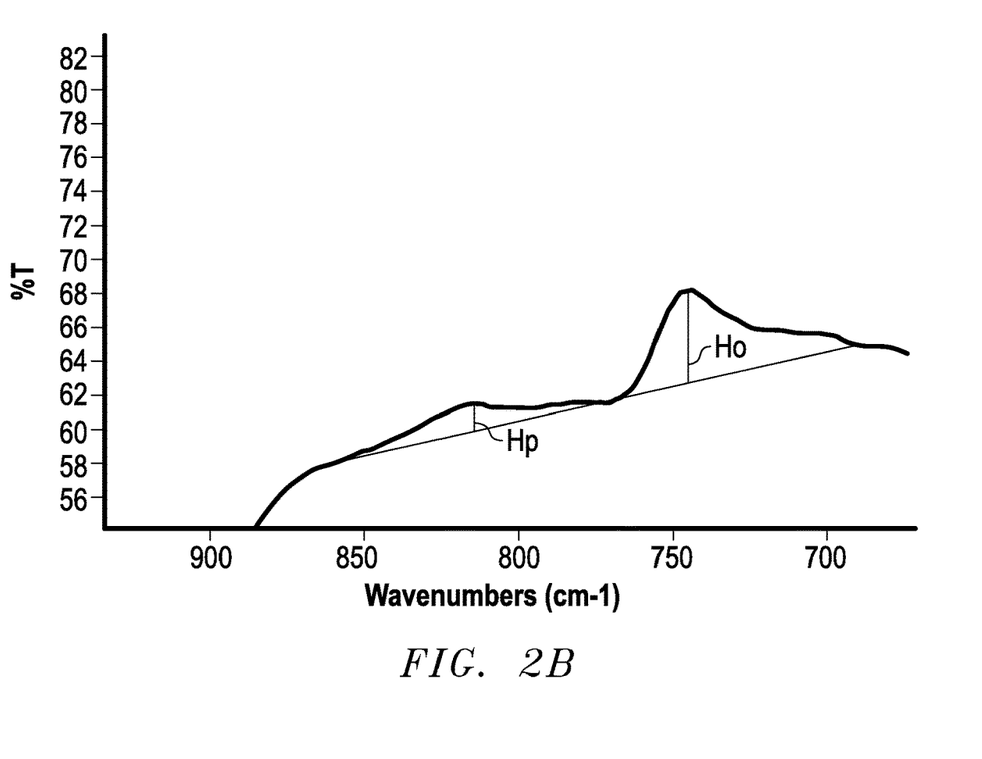
FIG. 2B includes a graph of a micro FT-IR readout of an abrasive article sample in accordance with an embodiment.

FIG. 2A includes a microscopic FT-IR spectrum of a sample taken from an abrasive article formed with conventional phenolic resin, FIG. 2B includes a microscopic FT-IR readout of a sample of an abrasive article representative of embodiments herein. As demonstrated in FIGS. 2A and 2B, the ortho substituent signal peaks between wavenumber 747 to 755 cm$^{-1}$, and para substituent from 811 to 827 cm$^{-1}$. The baseline of the signals is set by drawing a straight line connecting the endpoints at about 700 cm$^{-1}$ and 860 cm$^{-1}$, and the peak height for each substituent signal is the distance along the line perpendicular to the x-axis from the highest point of the peak to where the line and the baseline intersect, the vertical height between the peak and the baseline. The peak height is referenced to as Hp and Ho for para and ortho signals, respectively, in FIGS. 2A and 2B. As illustrated in FIG. 2A, the peak height of the para signal is 3.2397, and the ortho is 4.4638. In FIG. 2B, the peak height of the para signal is 1.5629, and the ortho is 5.4660.

TABLE 1

| Step | Description | Disk | Lubricant | Force (single) (lbs) | Head Speed (rpm) | Plate Speed (rpm) | Rotation of the plate | Time (minutes) |
|---|---|---|---|---|---|---|---|---|
| 1 | Plane Grinding | 30 μm DGD | Water | 2 | 0 | 120 | COMP | A.N. |
| 2 | Fine Grinding | 15 μm DGD | Water | 2 | 0 | 120 | COMP | A.N. |
| 3 | Preparatory Polishing | TEXMET P | METADI SUPREME 9 μm | 2 | 50 | 150 | COMP | 5 |
| 4 | Preparatory Polishing | TEXMET 1500 | METADI SUPREME 6 μm | 2 | 0 | 300 | COMP | 3 |
| 5 | Fine Polishing | TEXMET 1500 | METADI SUPREME 3 μm | 3 | 0 | 200 | COMP | 3 |
| 6 | Fine Polishing | TEXMET 1500 | METADI SUPREME 1 μm | 3 | 0 | 200 | COMP | 3 |
| 7 | Final Polishing | Microcloth | MasterPolish II | 3 | 0 | 150 | CON | 3 |

The average of the peak heights of all the tested samples for each of ortho and para signals is used to determine the average ratio between the ortho substituents and para substituents for the abrasive article. In some instances, samples taken from the same abrasive article may be processed and tested with micro FT-IR by different technicians, and the signal heights from all of samples are used to obtain an average peak height. A skilled artisan would know, according to Lambert-Beer law, signal intensity detected by FT-IR is proportional to the contents of ortho and para substituents. Thus, an average ortho to para substituent ratio is determined by Ra=Ho:Hp, where Ra is an average ortho to para substituent ratio of an abrasive article, Ho is the average height of ortho peaks of tested samples of the abrasive article, and Hp is the average height of the para peaks for the same samples tested to obtain the average ortho peak.

In a particular embodiment, the bond material can include an average ratio of ortho substituents to para substituents of at least 1.5:1 to facilitate improved performance of an abrasive article. For example, the average ratio can be at least 1.6:1 or at least 1.7:1 or at least 1.8:1 or at least 1.9:1 or at least 2.0:1 or at least 2.1:1 or at least 2.5:1 or at least 2.6:1 or at least 2.7:1 or at least 2.8:1 or at least 2.9:1 or at least 3:1 or at least 3.1:1 or at least 3.2:1 or at least 3.3:1 or at least 3.4:1 or at least 3.5:1 or at least 3.6:1 or at least 3.7:1 or at least 3.8:1 or at least 3.9:1 or at least 4:1 or at least 4.1:1 or at least 4.2:1 or at least 4.3:1 or at least 4.4:1 or at least 4.5:1 or at least 4.6:1 or at least 4.7:1 or at least 4.8:1 or at least 4.9:1 or at least 5:1 or at least 5.1:1 or at least 5.2:1 or at least 5.3:1 or at least 5.4:1 at least 5.5:1 or at least 5.6:1 or at least 5.7:1 or at least 5.8:1 or at least 5.9:1 or at least 6:1 or at least 6.1:1 or at least 6.2:1 or at least 6.3:1 or at least 6.4:1. In another non-limiting embodiment, the bond material may include an average ortho substituent to para substituent ratio of not greater than 9:1, such as not greater than 8.9:1 or not greater than 8.8:1 or not greater than 8.7:1 or not greater than 8.6:1 or not greater than 8.5:1 or not greater than 8.4:1 or not greater than 8.3:1 or not greater than 8.2:1 or not greater than 8.1:1 or not greater than 8:1 or not greater than 7.9:1 or not greater than 7.8:1 or not greater than 7.7:1 or not greater than 7.6:1 or not greater than 7.5:1 or not greater than 7.4:1 or not greater than 7.3:1 or not greater than 7.2:1 or not greater than 7.1:1 or not greater than 7.0:1 or not greater than 6.9:1 or not greater than 6.8:1 or not greater than 6.7:1 or not greater than 6.6:1 or not greater than 6.5:1 or not greater than 6.4:1. It is to be understood that the average ortho to para substituent ratio can be within a range including any of the minimum and maximum ratios disclosed herein. For example, an average ratio can be within a range including at least 2.1:1 and not greater than 8.9:1 or within a range including at least 3.2:1 and not greater than 8:1 or within a range including at least 4:1 and not greater than 7.5:1 or within a range including at least 5.1:1 and not greater than 7:1 or within a range including at least 5.3:1 and not greater than 6.4:1. In a particular embodiment, the bond material can include an average ortho to para substituent ratio for the methylene bridge within a range including at least 3:1 and not greater than 6.9:1.

According to an embodiment, the bonded body of the abrasive article can include a certain content of the abrasive particles, which may facilitate improved formation and/or performance of an abrasive article. For instance, a content of the abrasive particles can be at least 2 vol % for the total volume of the body, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, or even at least 35 vol %. In another instance, a content of the abrasive particles within the bonded abrasive body may be not greater than 65 vol %, such as not greater than 64 vol %, not greater than 62 vol %, not greater than 60 vol %, not greater than 58 vol %, not greater than 56 vol %, not greater than about 54 vol %, not greater than 52 vol %, not greater than 50 vol %, not greater than 48 vol %, not greater than 46 vol %, not greater than 44 vol %, not greater than 42 vol %, not greater than 40 vol %, not greater than 38 vol %, not greater than 36 vol %, not greater than 34 vol %, not greater than 32 vol %, not greater than 30 vol %, or greater than 28 vol %, not greater than 26 vol %), not greater than 24 vol %), not greater than 22 vol %, or not greater than 20 vol %. It will be appreciated that a content of the abrasive particles can be within a range including any of the minimum and maximum percentages noted above. For example, a content of the abrasive particles in the body can be within a range of 2 vol % to 64 vol %, within a range of 12 vol % to 62 vol %, or within a range of 20 vol % to 58 vol %.

The body of the abrasive article can be formed to have certain porosity. In an embodiment, porosity can be at least 5 vol % for a total volume of the body. For example, porosity can be at least 8 vol %, at least 10 vol %, at least 12 vol %, at least 14 vol %, at least 16 vol %, at least 18 vol %, at least 20 vol %, at least 25 vol %, at least 30 vol %, at least 40 vol %, at least 45 vol %, or at least 50 vol %. In another embodiment, porosity of the body may be not greater than 80 vol %. For instance, porosity may be not greater than 75 vol %, not greater than 70 vol %, not greater than 60 vol %, not greater than 55 vol %, not greater than 50 vol %, not greater than 45 vol %, or not greater than 40 vol %. It will be appreciated that porosity of the body can be within a range including any of the minimum to maximum percentages noted above. For example, porosity of the body can be within a range of 1 vol % to 80 vol %, within a range of 8 vol % to 55 vol %, or within a range of 14 vol % to 40 vol %.

The porosity of the body can be in various forms. For instance, the porosity can be closed, open, or include closed porosity and open porosity. In an embodiment, the porosity can include a type of porosity selected from the group consisting of closed, porosity, open porosity, and a combination thereof. In another embodiment, the majority of the porosity can include open porosity. In a particular embodiment, all of the porosity can essentially be open porosity. Still, in another embodiment, the majority of the porosity can include closed porosity. For example, all of the porosity can be essentially closed porosity.

The body can include pores having certain average pore sizes. In an embodiment, the average pore size may be not greater than 500 microns, such as not greater than 450 microns, not greater than 400 microns, not greater than 350 microns, not greater than 300 microns, not greater than 250 microns, not greater than 200 microns, not greater than 150 microns, or not greater than 100 microns. In another embodiment, the average pore size can be at least 0.01 microns, at least 0.1 microns, or at least 1 micron. It will be appreciated that the body can have an average pore size within a range including any of the minimum to maximum values noted above. For example, the average pore size of the body can be within a range of 0.01 microns to 500 microns, within a range of 0.1 microns to 350 microns, or within a range of 1 micron to 250 microns.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. An abrasive article comprising a body including a bond material comprising a methylene bridge; and abrasive particles contained within the bond material, wherein the bond material has an average ortho to para substituent ratio for the methylene bridge within a range including at least 1.5:1 and not greater than 9:1.

Embodiment 2. The abrasive article of embodiment 1, wherein the bond material comprises an average ortho to para substituent ratio for the methylene bridge within a range including at least 1.5:1 or at least 1.6:1 or at least 1.7:1 or at least 1.8:1 or at least 1.9:1 or at least 2.0:1 or at least 2.1:1 or at least 2.5:1 or at least 2.6:1 or at least 2.7:1 or at least 2.8:1 or at least 2.9:1 or at least 3:1 or at least 3.1:1 or at least 3.2:1 or at least 3.3:1 or at least 3.4:1 or at least 3.5:1 or at least 3.6:1 or at least 3.7:1 or at least 3.8:1 or at least 3.9:1 or at least 4:1 or at least 4.1:1 or at least 4.2:1 or at least 4.3:1 or at least 4.4:1 or at least 4.5:1 or at least 4.6:1 or at least 4.7:1 or at least 4.8:1 or at least 4.9:1 or at least 5:1 or at least 5.1:1 or at least 5.2:1 or at least 5.3:1 or at least 5.4:1 at least 5.5:1 or at least 5.6:1 or at least 5.7:1 or at least 5.8:1 or at least 5.9:1 or at least 6:1 or at least 6.1:1 or at least 6.2:1 or at least 6.3:1 or at least 6.4:1.

Embodiment 3. The abrasive article of any one of the preceding embodiments, wherein the bond material comprises an average ortho to para substituent ratio for the methylene bridge within a range including not greater than 9:1 or not greater than 8.9:1 or not greater than 8.8:1 or not greater than 8.7:1 or not greater than 8.6:1 or not greater than 8.5:1 or not greater than 8.4:1 or not greater than 8.3:1 or not greater than 8.2:1 or not greater than 8.1:1 or not greater than 8:1 or not greater than 7.9:1 or not greater than 7.8:1 or not greater than 7.7:1 or not greater than 7.6:1 or not greater than 7.5:1 or not greater than 7.4:1 or not greater than 7.3:1 or not greater than 7.2:1 or not greater than 7.1:1 or not greater than 7.0:1 or not greater than 6.9:1 or not greater than 6.8:1 or not greater than 6.7:1 or not greater than 6.6:1 or not greater than 6.5:1 or not greater than 6.4:1.

Embodiment 4. The abrasive article of any one of the preceding embodiments, wherein the bond material comprises an average ortho to para substituent ratio for the methylene bridge within a range including at least 2.1:1 and not greater than 8.9:1 or within a range including at least 3.2:1 and not greater than 8:1 or within a range including at least 4:1 and not greater than 7.5:1 or within a range including at least 5.1:1 and not greater than 7:1 or within a range including at least 5.3:1 and not greater than 6.4:1.

Embodiment 5. The abrasive article of any one of the preceding embodiments, wherein the bond material comprises an average ortho to para substituent ratio for the methylene bridge within a range including at least 3:1 and not greater than 6.9:1.

Embodiment 6. The abrasive article of any one of the preceding embodiments, wherein the bond material comprises a phenolic resin.

Embodiment 7. The abrasive article of any one of the preceding embodiments, wherein the bond material comprises novolac resin.

Embodiment 8. The abrasive article of any one of the preceding embodiments, wherein the abrasive particles comprise nanocrystalline alumina.

Embodiment 9. A method of forming an abrasive article comprising forming a mixture including a bond material and abrasive particles, wherein the bond material comprises a bisphenol F and an average ortho to para substituent ratio of at least 1.4:1 and not greater than 8.2:1.

Embodiment 10. The method of embodiment 9, wherein the bond material comprises an average ortho to para substituent ratio within a range including at least 1.4:1 or at least 1.5:1 or at least 1.6:1 or at least 1.7:1 or at least 1.8:1 or at least 1.9:1 or at least 2.0:1 or at least 2.1:1 or at least 2.5:1 or at least 2.6:1 or at least 2.7:1 or at least 2.8:1 or at least 2.9:1 or at least 3:1 or at least 3.1:1 or at least 3.2:1 or at least 3.3:1 or at least 3.4:1 or at least 3.5:1 or at least 3.6:1 or at least 3.7:1 or at least 3.8:1 or at least 3.9:1 or at least 4.0:1 or at least 4.1:1 or at least 4.2:1 or at least 4.3:1 or at least 4.4:1 or at least 4.5:1 or at least 4.6:1 or at least 4.7:1 or at least 4.8:1 or at least 4.9:1 or at least 5:1 or at least 5.1:1 or at least 5.2:1 or at least 5.3:1 or at least 5.4:1 or at least 5.5:1 or at least 5.6:1 or at least 5.7:1.

Embodiment 11. The method of embodiment 9 or 10, wherein the bond material comprises an average ortho to para substituent ratio within a range including not greater than 8.2:1 or not greater than 8.1:1 or not greater than 8:1 or not greater than 7.9:1 or not greater than 7.8:1 or not greater than 7.7:1 or not greater than 7.6:1 or not greater than 7.5:1 or not greater than 7.4:1 or not greater than 7.3:1.

Embodiment 12. The method of any one of embodiments 9 to 11, wherein the bond material comprises an average ortho to para substituent ratio within a range including at least 1.4:1 and not greater than 8.2:1 or within a range including at least 3:1 and not greater than 8:1 or within a range including at least 5.7:1 and not greater than 7.5:1.

Embodiment 13. The method of any one of embodiments 9 to 12, wherein the bond material comprises a novolac resin including an ortho-ortho' bisphenol F in a first average content of at least 2 wt % or at least 2.1 wt % or at least 2.4 wt % or at least 2.8 wt % or at least 3.4 wt % or at least 4.4 wt % relative to a total weight of the novolac resin.

Embodiment 14. The method of any one of embodiments 9 to 13, wherein the bond material comprises a novolac resin including an ortho-ortho' bisphenol F in a first average content of not greater than 9.7 wt % or not greater than 9.1 wt % or not greater than 8.7 wt % or not greater than 8.1 wt % or not greater than 7.7 wt % or not greater than 6.9 wt % or not greater than 6.7 wt % relative to a total weight of the novolac resin.

Embodiment 15. The method of any one of embodiments 9 to 14, wherein the bond material comprises a novolac resin including a para-para' bisphenol F in a second average content of not greater than 3.3 wt % or not greater than 3.1 wt % or not greater than 2.8 wt % or not greater than 2.3 wt % relative to the total weight of the novolac resin.

Embodiment 16. The method of any one of embodiments 9 to 15, wherein the bond material comprises a novolac resin including a para-para' bisphenol F in a second average content of at least 0.15 wt % or at least 0.55 wt % or at least 1.05 wt % or at least 1.55 wt % for a total weight of the novolac resin.

Embodiment 17. The method of any one of embodiments 9 to 16, wherein the bond material further comprises a monomer, an oligomer, a polymer, or any combination thereof.

Embodiment 18. The method off embodiment 17, wherein the oligomer, the polymer, or both are derived from bisphenol F.

Embodiment 19. The method of any one of embodiments 9 to 18, wherein the bond material further comprises a resole resin.

Embodiment 20. The method of any one of embodiments 9 to 19, wherein the bond material comprises a novolac resin.

Embodiment 21. The method of any one of embodiments 9 to 20, wherein the abrasive particles comprise nanocrystalline alumina.

Example 1

Representative bonded abrasive wheels S1 to S4 were formed including the compositions disclosed in Tables 2 to 5 below. The abrasive grains were first mixed with liquid resole in a mixing bowl for 2 to 7 minutes or until all of the grains were wet and coated by the liquid resole resin. The wet abrasive grains were then combined with the rest of the bond material. The mixture of each sample was poured into a mold, and cold pressed. The samples were then removed from the molds and heat treated in a furnace at 160° C. for the bond material to cure. All of the bond materials for forming S1 to S4 had an average ortho substituent to para substituent ratio of 6.0. The average ortho to para substituent ratios of the bond material were tested as disclosed herein. The wheels had an ortho to para substituent ratio of 6.4, which was determined as disclosed herein.

TABLE 2

Composition of Sample S1

| Composition | Components | vol % | wt % |
|---|---|---|---|
| Abrasive particles | Black silicon carbide | 23.0 | 39 |
| | Monocrystalline alumina | 11.5 | 24 |
| | Brown alumina | 11.5 | 24 |
| Bond material | Novolac Resin | 15.7 | 11 |
| | Resole Resin | 2.8 | 2 |
| Pores | | 35.5 | 0 |

TABLE 3

Composition of Sample S2

| Composition | Components | vol % | wt % |
|---|---|---|---|
| Abrasive particles | Nanocrystalline alumina | 32.2 | 64 |
| | White alumina | 6.9 | 14 |
| | Green silicon carbide | 6.9 | 11 |
| Bond material | Novolac Resin | 16.2 | 10 |
| | Resole Resin | 2.9 | 2 |
| Pores | | 35 | 0 |

TABLE 4

Composition of Sample S3

| Composition | Components | vol % | wt % |
|---|---|---|---|
| Abrasive particles | Nanocrystalline alumina | 32.2 | 63 |
| | White alumina | 6.9 | 13 |
| | Green silicon carbide | 6.9 | 11 |
| Bond material | Novolac Resin | 16.6 | 11 |
| | Resole Resin | 2.9 | 2 |
| Pores | | 34.5 | 0 |

TABLE 5

Composition of Sample S4

| Composition | Components | vol % | wt % |
|---|---|---|---|
| grain | Nanocrystalline alumina | 27.6 | 55 |
| | White alumina | 9.2 | 18 |
| | Green silicon carbide | 9.2 | 15 |
| bond | Novolac Resin | 15.7 | 10 |
| | Resole Resin | 2.8 | 2 |
| pore | | 35.5 | 0 |

Example 2

Figure 3:
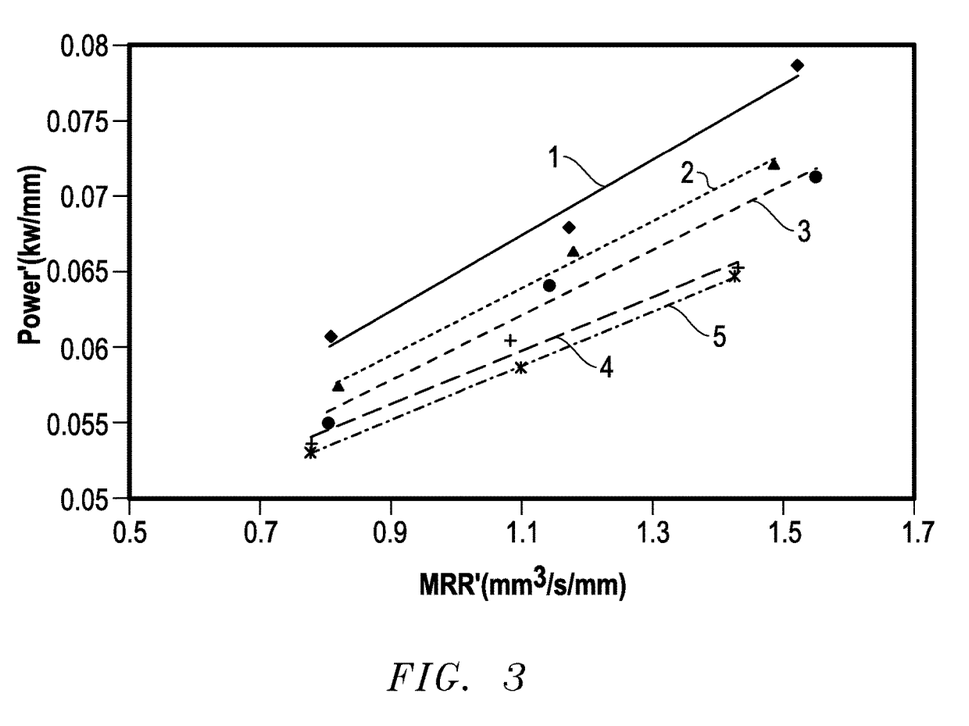
FIG. 3 includes a plot of power versus material removal rate of different grinding wheels.

Abrasive wheel samples were formed in the same manner as the samples in Example 1 with bond materials having different ortho to para substituent ratio. The wheel samples had the same compositions disclosed in Table 6 below. The compositions and average ortho to para substituent ratios of the novolac resins are included in Table 6. The average ortho to para substituent ratios were tested using GC-FID in accordance with embodiments disclosed herein. As disclosed in Table 7, Composition 1 included a conventional novolac resin with an average ortho to para substituent ratio of 1.1. Composition 5 included a representative novolac resin having an average ortho to para substituent ratio of 6.4. Each of Compositions 2 to 4 includes a blend of Compositions 1 and 5. As the contents of the conventional resin and representative resin change, the resulted blends of Compositions 2 to 4 have an average ortho to para substituent ratio of 2.0, 3.2, and 5.3, respectively. The wheel samples were tested on grinding platform to grind D3 steel. Effect of ortho to para substituent ratios on wheel performance is illustrated in FIG. 3, which includes material removal rates of the wheels plotted against power needed to achieve the corresponding removal rate. The results in FIG. 3 are referenced corresponding to the compositions of the bond materials. Each data point is the average of two wheels having the same bond material composition. As demonstrated in FIG. 3, Composition 1 requires highest power for each material removal rate compared to the other compositions. For any given material removal rate, power is reduced when ortho to para substituent ratio increases. At the same power, Composition 1 has the lowest material removal rate compared to the other compositions, and compositions having higher average ortho to para substituent ratios demonstrate higher material removal rates.

TABLE 6

| Components | | Vol % | Wt % |
|---|---|---|---|
| Abrasive particles | Nanocrystalline alumina | 32.2 | 64 |
| | White alumina | 6.9 | 14 |
| | Green silicon carbide | 6.9 | 11 |
| Bond | Novolac resin | 16.2 | 10 |
| | Resole resin | 2.9 | 2 |
| Pore | | 35 | 0 |

TABLE 7

| Compositions | Conventional resin wt % | Representative resin wt % | o/p ratio |
|---|---|---|---|
| 1 | 100 | 0 | 1.1 |
| 2 | 56 | 44 | 2.0 |
| 3 | 29 | 71 | 3.2 |
| 4 | 6 | 94 | 5.3 |
| 5 | 0 | 100 | 6.4 |

Example 3

Figure 4:
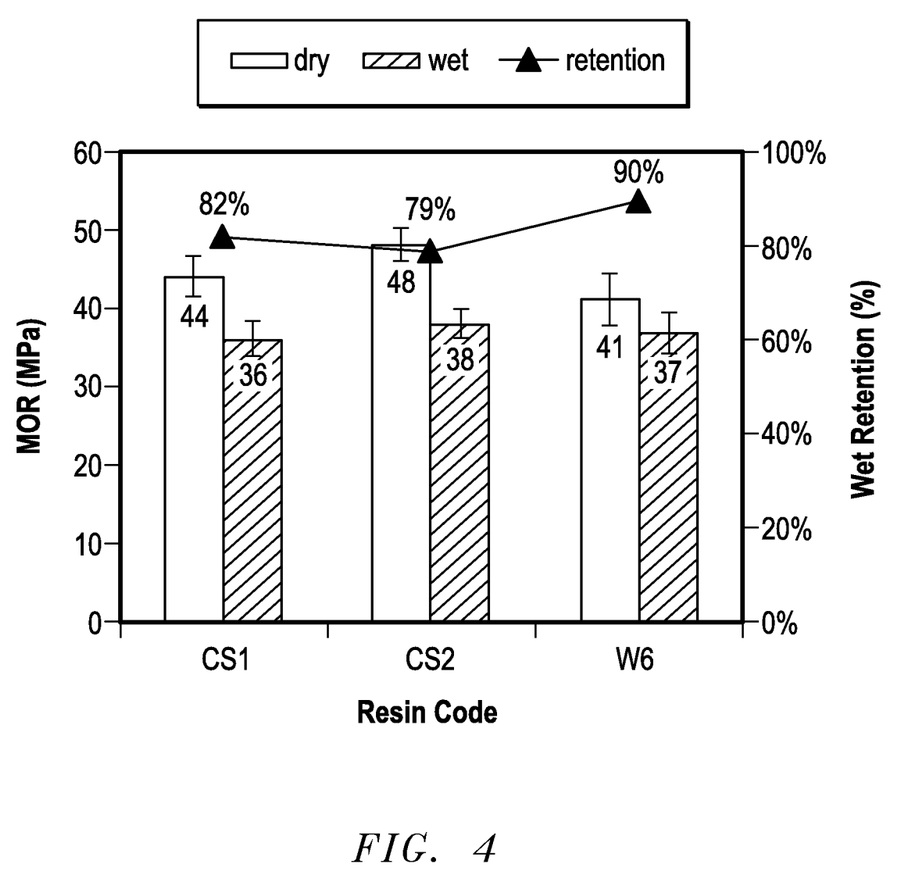
FIG. 4 includes a graph of MOR and wet retention of conventional abrasive articles and a representative abrasive article with or without wet treatment.

Conventional abrasive articles, CS1 and CS2, and a representative abrasive article, W6, were formed including the composition disclosed in Table 8 below. All of the samples had a dimension of 4 inch×1 inch×0.5 inch. The bond materials of CS1 and CS2 had an average ortho to para substituent ratio of about 1.0, while the bond material of W6 had an average ratio of 5.79. For each composition, at least six samples were formed. MOR was measured by a three-point bending test utilizing an Instron® tester at ambient temperature. Load of 10 kN, test speed of 1.27 mm/min, and support span of 50.8 mm was applied. Samples were also tested in a wet condition by first soaking the samples in water for seven days, and then performing the same three-point bending test. Wet retention was measured for the samples tested in the wet condition. As illustrated in FIG. 4, the wheels samples CS1, CS2, and W6 demonstrated similar MOR for both dry and wet conditions. W6 demonstrated improved wet retention over CS1 and CS2, 90% versus 82% and 79%.

TABLE 8

| Components | | Vol % | Wt % |
|---|---|---|---|
| Abrasive particles | Nanocrystalline alumina | 13.8 | 27 |
| | White alumina | 16.1 | 32 |
| | Green silicon carbide | 16.1 | 26 |
| Bond | Novolac resin | 19.908 | 13 |
| | Resole resin | 3.792 | 2 |
| Pore | | 30.3 | |

Example 4

Figure 5:
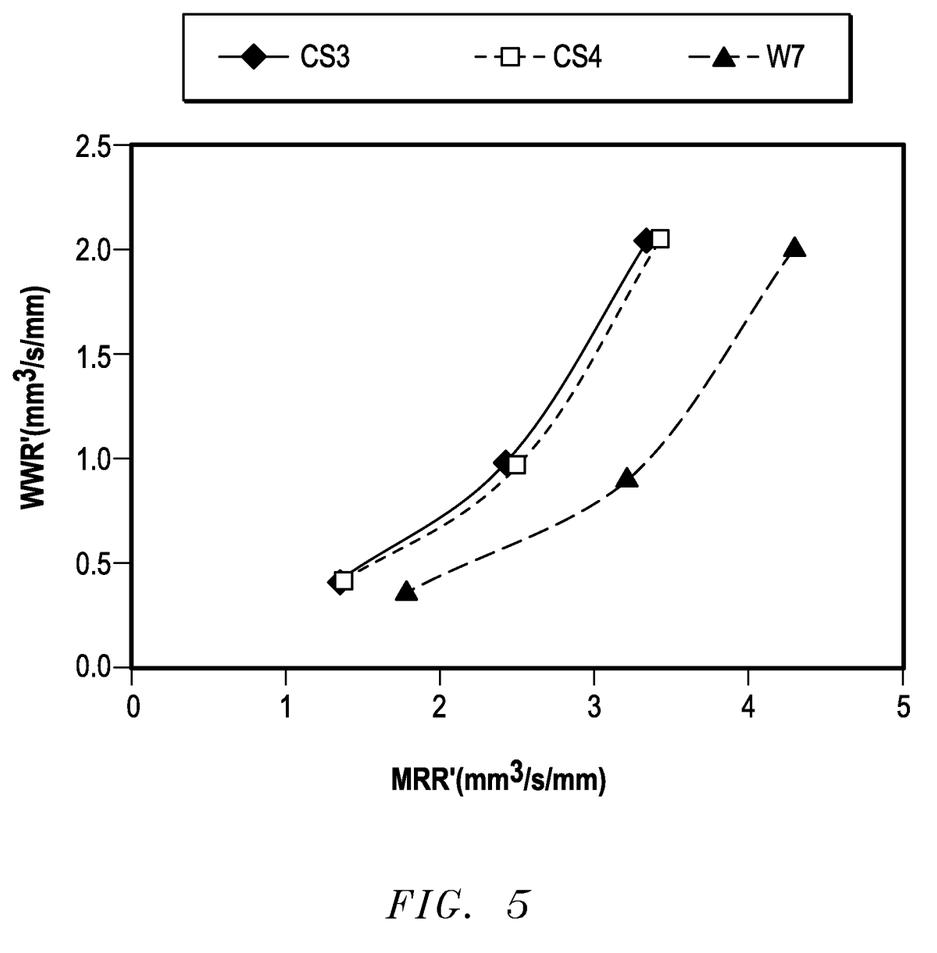
FIG. 5 includes a plot of material removal rate versus wear rate of conventional abrasive articles and a representative abrasive article.

Additional abrasive wheel samples were formed including the compositions disclosed in Table 9. The wheel samples were formed in the same manner as the samples disclosed in Example 1. Conventional samples CS3 and CS4 were formed with bond materials having an average ortho to para substituent ratio of 1.0, while the representative sample W7 was formed with a representative bond material having an average ratio of 5.79. All of the wheel samples had the same dimension, 350×20×127 mm, and each was used to grind a M2 workpiece on a Junker high speed OD grinder at a wheel speed of 35 m/s and workpiece speed of 150 rpm. Three radial infeeds, 0.012 mm, 0.018 mm, and 0.024 mm, were used. As illustrated in FIG. 5, compared to CS3 and CS4, at the same wheel wear rate, W7 demonstrated an increased material removal rate. For instance, at a wear rate of 0.5 mm$^3$/s/mm, the material removal rate for both CS3 and CS4 was about 1.5 mm$^3$/s/mm, but about 2.5 mm$^3$/s/mm for W7.

The present embodiments represent a departure from the state of the art. Notably, embodiments herein may include a bond material including an average ortho to para substituent ratio higher than that in the conventional bond materials. Unexpectedly, abrasive articles of the embodiments herein may have improved performance, such as decreased wear rate at a given material removal rate, which can be expected to improve consistency in wheel grinding performance over a longer time period, and increase the service life of abrasive articles. Improved wet retention can make the abrasive article of embodiments herein more suitable for organic wet grinding.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a body including:
      a bond material comprising a methylene bridge present at a para or ortho site of an aromatic phenolic ring; and
      abrasive particles contained within the bond material, wherein the bond material comprises an average ortho to para substituent ratio for the methylene bridge within a range including at least 1.5:1 and not greater than 9:1, wherein the bond material consists of cross-linked phenolic resin formed by a cross-linking agent and a precursor bond material, wherein the precursor bond material consists of phenolic resins.

2. The abrasive article of claim 1, wherein the average ortho to para substituent ratio for the methylene bridge is at least 2.0:1 and not greater than 8:1.

3. The abrasive article of claim 1, wherein the average ortho to para substituent ratio for the methylene bridge is at least 5.3:1 and not greater than 7:1.

4. The abrasive article of claim 1, wherein the abrasive particles comprise silicon carbide, alumina, or a combination thereof.

5. The abrasive article of claim 1, wherein the body comprises the bond material in a content of at least 5 vol % and not greater than 65 vol % for a total volume of the body, abrasive particles in a content of at least 10 vol % and not greater than 65 vol % for the total volume of the body, and porosity of at least 5 vol % and not greater than 70 vol % for a total volume of the body.

6. The abrasive article of claim 1, wherein the abrasive particles comprise a blend of abrasive particles including a first type of abrasive particles and a second type of abrasive particles that are different from the first type.

7. The abrasive article of claim 5, wherein the average ortho to para substituent ratio is at least 5.3:1 and not greater than 6.4:1.

8. The abrasive article of claim 1, wherein the average ortho to para substituent ratio is at least 5.3:1 and not greater than 6.4:1.

9. An abrasive article comprising:
a body including:
  a bond material comprising a methylene bridge present at a para or ortho site of an aromatic phenolic ring, wherein the bond material consists of cross-linked phenolic resin formed by a precursor bond material and a curing agent, wherein the precursor bond material consists of phenolic resins; and
  abrasive particles contained within the bond material, wherein the bond material comprises an average ortho to para substituent ratio for the methylene bridge within a range including at least 5.3:1 and not greater than 6.4:1.

10. The abrasive article of claim 9, wherein the body comprises for a total volume of the body:
at least 35 vol % and not greater than 60 vol % of the abrasive particles;
at least 10 vol % and not greater than 35 vol % of the bond material; and
at least of 25 vol % and not greater than 50 vol % of a porosity.

11. The abrasive article of claim 10, wherein the abrasive particles comprise a blend of abrasive particles including a first type of abrasive particles and a second type of abrasive particles that are different from the first type.

12. The abrasive article of claim 9, wherein the abrasive particles comprise silicon carbide, alumina, or any combination thereof.

13. A method of forming an abrasive article comprising:
B forming a mixture including a precursor bond material and abrasive particles, wherein the precursor bond material consists of phenolic resins; and
forming the abrasive article including a body including a bond material comprising a methylene bridge present at a para or ortho site of an aromatic phenolic ring and an average ortho to para substituent ratio for the methylene bridge within a range including at least 1.5:1 and not greater than 9:1, wherein the bond material consists of cross-linked phenolic resin formed by the precursor bond material and a curing agent.

14. The method of claim 13, wherein the average ortho to para substituent ratio is at least 2.0:1.

15. The method of claim 13, wherein the average ortho to para substituent ratio is within a range including at least 3:1 and not greater than 8:1.

16. The method of claim 13, wherein the phenolic resin comprises a novolac resin including:
an ortho-ortho' bisphenol F in a first average content including at least 2 wt % and not greater than 9.7 wt % for a total weight of the novolac resin.

17. The method of claim 16, wherein the novolac resin comprises a para-para' bisphenol F in a second average content of not greater than 3.3 wt % for the total weight of the novolac resin.

* * * * *

UNITED STATES PATENT AND TRADEMARK OFFICE
CERTIFICATE OF CORRECTION

| | |
|---|---|
| PATENT NO. | : 11,338,411 B2 |
| APPLICATION NO. | : 16/300435 |
| DATED | : May 24, 2022 |
| INVENTOR(S) | : Zehua Shi |

It is certified that error appears in the above-identified patent and that said Letters Patent is hereby corrected as shown below:

In the Claims

Column 22, Line 10-11, please delete "comprising: B forming", and insert --comprising: forming--

Signed and Sealed this
Eleventh Day of June, 2024

Katherine Kelly Vidal
*Director of the United States Patent and Trademark Office*